United States Patent

[11] 3,556,483

| [72] | Inventor | Roland G. Mantion |
| | | 132 Provost St., Chateauguay, Quebec, Canada |
| [21] | Appl. No. | 713,397 |
| [22] | Filed | Mar. 15, 1968 |
| [45] | Patented | Jan. 19, 1971 |

[54] CABLE LASHER
10 Claims, 7 Drawing Figs.

[52] U.S. Cl. .................................................. 254/134.3
[51] Int. Cl. .................................................. E21c 29/16
[50] Field of Search .................................. 254/134.3, CL

[56] References Cited
UNITED STATES PATENTS

| 2,592,943 | 4/1952 | Neale | 254/134.3 |
| 2,822,146 | 2/1958 | Ridgers | 254/134.3 |
| 3,208,727 | 9/1965 | Greene | 254/134.3 |
| 3,285,571 | 11/1966 | Weiler | 254/134.3 |

*Primary Examiner*—Andrew R. Juhasz
*Assistant Examiner*—David R. Melton
*Attorney*—Raymond A. Robic

ABSTRACT: A cable lasher comprising a ringlike spool of lashing wire through which the cables to be lashed are passed. While the spool moves relative to the cables, the wire unwinds from the spool and spirally surrounds the cables. A pair of twisted straps mounted at the outlet end of the spool holds the cables together and applies the wire in contact with said cables. The lashing wire is made self-lubricating and the spool is made rigid by immersing the spool of wire in a bath of hot wax and by removing it so as to let it solidify.

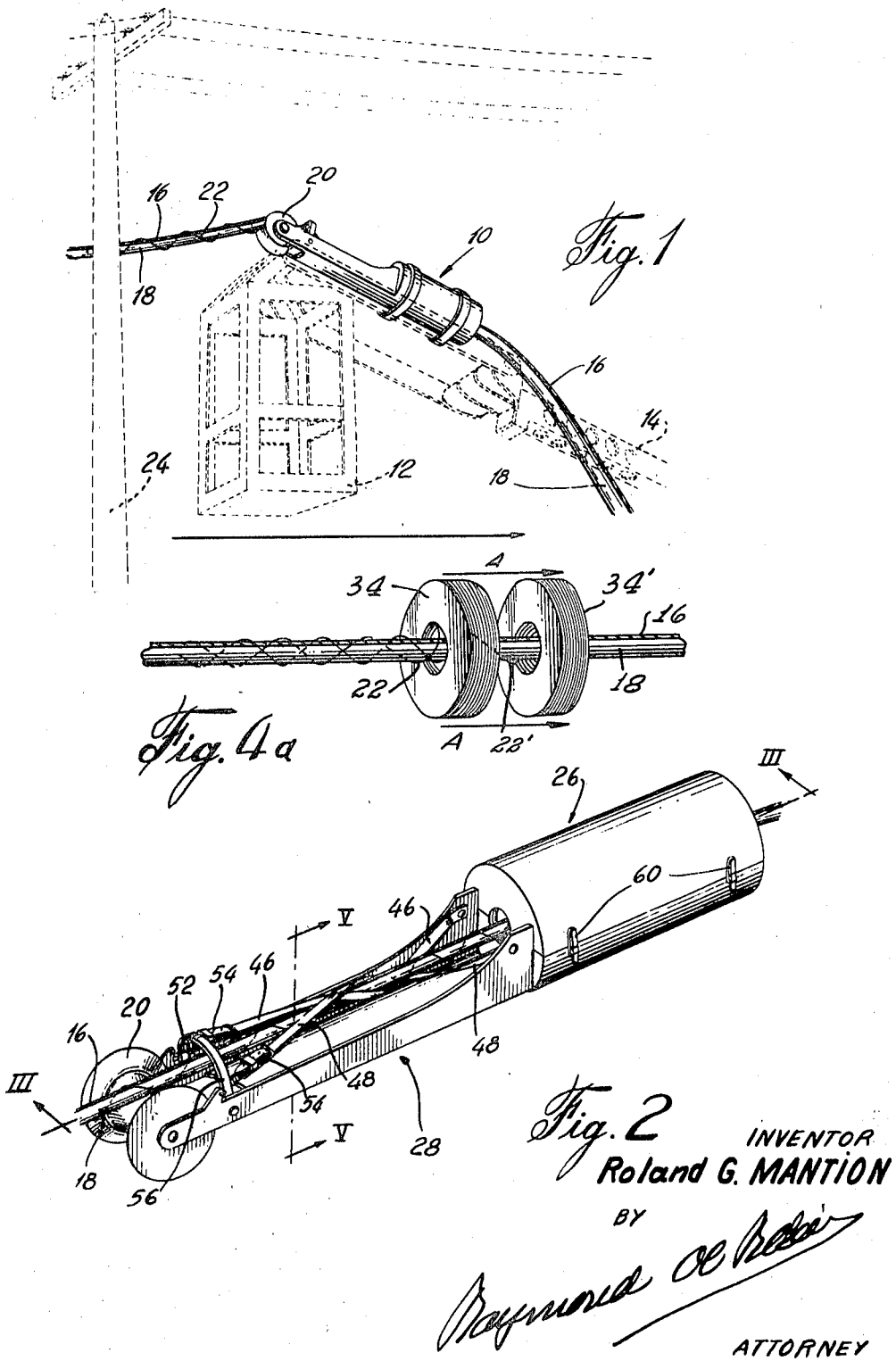

INVENTOR
Roland G. MANTION
ATTORNEY

CABLE LASHER

BACKGROUND OF INVENTION INVENTION:

1. Field of the Invention

The present application relates to a cable lasher for lashing together parallel cables with one or two lashing wires and more particularly to an arrangement for holding the cables together and for applying the wire in contact with the said cables. The wire is made self-lubricating.

2. Description of the Prior Art

The method for lashing cables disclosed in U.S. Pat. No. 3,185,444 issued on May 25, 1965 is a method which is generally used at the present time. This method, however, is especially foreseen to lash a new cable with cables which are already existing and installed. The operation, the structure and the functions of this device are quite remote from the ones of the present invention.

The mechanism described in U.S. Pat. No. 2,213,363 dated Sept. 3, 1940 seems to indicate that when the unwinding speed of the wire is too fast, certain difficulties may appear at the friction element. In the present application, no tightening device is mounted in a rotatable manner about the spool.

In U.S. Pat. No. 3,172,643 issued on Mar. 9, 1965 the apparatus may be used only on the side of the road because it is directly dependent on the self-propelled truck or vehicle 10 which must travel on the side of the road. The lashing speed is also very limited because the boom adjacent to the truck has a tendency to vibrate. In addition, the compensator assembly 114 is used to maintain a tension on the strand 18 within very close limits. The equipment in this patent is very costly compared to the applicant's apparatus.

The device described in U.S. Pat. No. 3,208,727 issued on Sept. 28, 1965 is directed to short transmission power lines and not for long lines such as for cable telephone leads. It is particularly directed to electric power wires extending between a transformer on a street and a building. Green, Jr. et al. must use braking means constituted by a rubber washer or disc. In practice, there is no type of rubber which is able to support such a wear so that this apparatus does not enable a uniform lashing. The present application is directed in particular to spirally wound nylon straps which are lubricated by a wax provided by the lashing wires of the spools. While in the patent to Green it is stated and illustrated that the end of the apparatus must be removed in order to pass the cables, the applicant's apparatus may be used without taking any elements apart.

In the patent to Weiler, U.S. Pat. No. 3,285,571, issued on Nov. 15, 1966, a split rubber sleeve is used to guide the cables but the sleeve wears out very fast. This apparatus is foreseen for short distances only as exemplified by the use of only one coil. The applicant's device will be used in general with a plurality of spools which may cover miles of cables without interruptions. Furthermore, the sleeve must be changed for any variation in the dimensions of the cables.

None of the above mentioned patents refers to a self-lubricating lashing wire as used by the applicant.

The cable lasher according to the present invention operates without having the cables under substantial tension contrary to what is usually the case for most of the prior devices. A well known phenomenon which consists of the twisting of the cables when the latter are under tension may be easily prevented by the applicant's device. This twisting is very annoying when another cable has to be added to the cables already installed. There exists a danger of damaging the covering of the cables already installed.

The fact that the present lasher enables the cables to be installed with only little tension constitutes a considerable advantage because the core of the transmission cable may comparatively be easily repaired. With known in contact the core of the transmission cable is tight and if one of the conductors in the core needs to be spliced, it usually results in a retraction of the cut conductor. Depending on the tightness of the cable, the retraction may be up to 3 feet. If the core has little or no tension as in the present invention, there is practically no retraction of the cut conductor and the repair is greatly facilitated. In actual operation of the present lasher which has a tendency to slightly pull on the covering sleeve of the cable, it has been found that some part of the core of the cable is under compression and that the cutting of a conductor results in the overlapping of the two ends of the cut conductor.

With most of the apparatuses already existing, three operations are required, two of which happen before the lashing of the cables; the supporting cables must first be installed by holding the latter under tension. Then the transmission cable is installed under tension and after, the cables are surrounded with the lashing wire. In the present invention, the first two operations are eliminated because everything is done in one and the same operation. An important advantage of the present invention also consists in the fact that the lashing may be done by only one man for distances such as 500 feet, two men for distances over 500 feet, up to unlimited miles. This cannot be done with prior devices and this constitutes a saving in labor.

SUMMARY OF THE INVENTION

The present invention consists of a cable lasher for lashing together parallel cables with one or more lashing wires which unwinds from ringlike spools onto the cables which pass through the ringlike spools. This lasher comprises an arrangement for simultaneously holding the cables together and applying the lashing wires in contact with the cables. This arrangement makes use of a pair of supporting plates, two straps, each strap having both ends connected to each plate, the middle portion of both straps being twisted over each other and adapted to surround a portion of the cables and the lashing wires spirally wound around said portion. The spool of wire is rigidified in a bath of wax and the wire is self-lubricating when passing through the straps.

BRIEF DESCRIPTION OF THE DRAWINGS

FIG. 1 is a perspective view of the device in operation;

FIG. 2 is a perspective enlarged view of the device according to the invention;

FIGS. 4 and 4a are perspective views of adjacent rigid spools of lashing wire connected to each other;

DESCRIPTION OF THE PREFERRED EMBODIMENT

Figure 3:
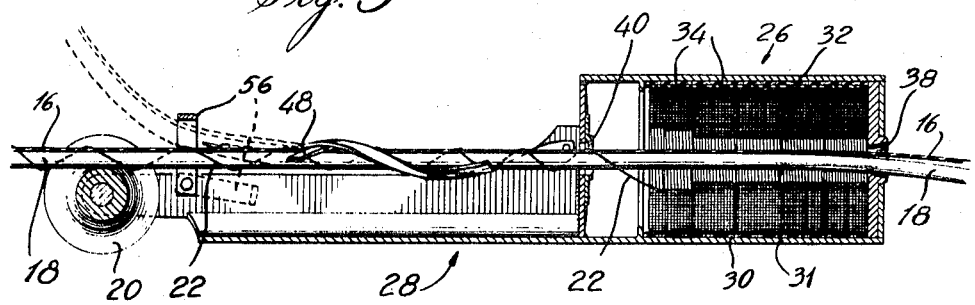
FIG. 3 is a cross-sectional view of the device along line III–III of FIG. 2.

FIG. shows a cable lasher 10 which is mounted adjacent a personnel basket 12 at the end of a boom 14. A strand or supporting cable 16 and an adjacent electric cable 18 are passed through the cable lasher 10, extend over the pulley 20 and come out with a lashing wire 22 spirally wound around the combined supporting cable 16 and electric cable 18.

The boom 14 is mounted on a truck (not shown) adapted for that purpose. The truck moves from left to right according to FIG. 1 and the combined cables 16 and 18 are fed to the cable lasher 10. The truck moves along a direction substantially parallel to the direction of the cable to be installed and whenever needed the lashed cables are held to a post 24 by an appropriate bracket.

Cable lasher 10 consists of a container 26 in which the lashing wire is stored in the shape of ringlike spools, and a compression arrangement 28 which holds the two cables firmly together and applies the lashing wire in contact with the said cables. The container 26 is constituted by a casing 30 which is preferably cylindrical in shape and a semicylindrical cover 32 provided for the insertion of the spools 34. A layer of foam rubber 31 is preferably mounted between the spools 34 and the casing 30. The foam rubber 31 is used to take up the small differences of diameter of the spools even if they contain the same number of feet of wire 22. The foam rubber 31 is covered by layer of nylon fabric 33. The spools consist of lashing wire 22 having a high tension such as steel or nylon and this wire is waxed to form a rigid spool. The container 26 has two openings 38 and 40 at each end so as to enable the cables 16 and 18 to pass therethrough.

The wire 22 coming from the central part of the spools 34 is pulled by the cables and automatically spirally winds around them.

Figure 5:
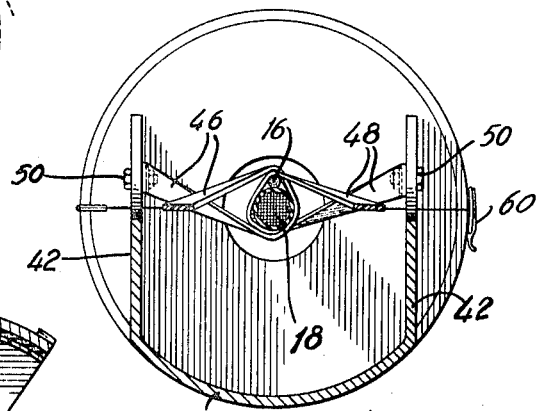
FIG. 5 is a cross-sectional view along line V–V of FIG. 2.
Figure 6:
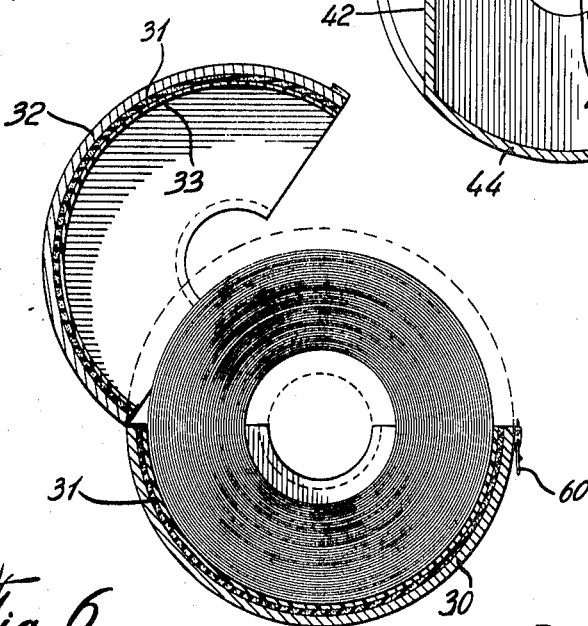
FIG. 6 is a cross-sectional view along line V–V of through the spool container with the lid partly opened.

The compression arrangement 28 consists of a bracket having two oppositely facing plates or beams 42 spaced apart by a bottom plate 44 solidly welded to the casing 30. The forward or free end of the plates 42 are connected by a roller 20 having a deep groove for the passage of the lashed cables. As shown in FIG. 5, the strap 46 is fixed to the left-hand side plate 42 and the strap 48 is fixed to the right-hand side plate 42. The middle portion of the two straps are twisted together as illustrated in FIGS. 3 and 5 so as to enable the cables 16 and 18 to pass therebetween. The two straps 46 and 48 are preferably twisted only once and each is made of a strong nylon textile solidly fixed at one end by a bolt 50. When these straps become worn out, they may be easily replaced at a low cost. The straps are held at the forward end of the plates 42 by springs 52 so that the straps may take up any small change in the dimensions in the cables. Furthermore, the straps are provided with a buckle 54 so that they may be adjusted for cables having various diameters.

The cables 16 and 18 proceed with the spirally wound lashing wire 22 through the straps 46 and 48. The latter holds firmly the cables together while providing a pulling effect on the lashing wire 22 so as to lengthen the amplitude of the spiral of the lashing wire 22. At the output end of the compression arrangement, the cables are coming out with the wire in contact with them. Obviously, more than two cables may be lashed at the same time.

The straps 46 and 48 are not set to strongly compress the cables together or to tightly pull the wire over the cables. For instance, some known lashers pull the lashing wire tightly and provide an amplitude of the wire of about 14 inches around the cables while the present lasher pulls only lightly on the wire and provides an amplitude of about 5 to 10 inches. Such a light pressure of the wire and a small tension on the cables greatly facilitate the maintenance of the installation.

Although the cable lasher may be used for lashing underground cables or underwater cables, it is generally used for aerial cables as shown in FIG. 1. Accordingly, the device 10 is set at an angle so that the unlashed cables 16 and 18 come from the ground without tension and pass through the device 10 to be fixed at a distance above the ground. In this latter arrangement, the roller 20 having a deep groove will facilitate the outlet of the lashed cables. However, since the device may be used in various ways and at various angles between the unlashed and lashed cables, a guard 56 is mounted across the two plates 52 at the output end of the cable compression arrangement 28. This guard 56 will be used as a guard against the possibility of the lashed cable falling off the roller 20. This may particularly happen if the truck carrying the boom 14 must travel at a distance away from the direction of the cables to be set. For instance, the truck may have to travel along the side of the street and install the lashed cables towards the middle of the street or vice versa.

As indicated in FIG. 3, the guard 56 may also be removed from the path of the lashed cables if it interferes with the smooth delivery of the lashed cables.

Figure 4:
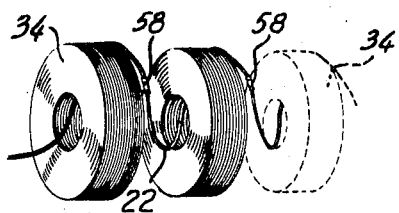

In order to provide a long continuous operation of the device, a plurality of spools 34 are assembled as shown in FIG. 4 by connecting the trailing end of one spool with the leading end of the next spool with a clip 58. Such an assembly of spools enables continuous operation for miles of lashing. These spools are ringlike shaped with an open core at the center and are made with a lashing wire 22 rigidly in spools so as to be self-lubricating when it passes through the straps 46 and 48. The unwinding is preferably made from the center as shown in FIGS. 3 and 4. The spools are set into the container 26 which has a cover 32 fixed to a casing 30, the casing and the cover each consisting of about one-half the contour of the cylinder so as to facilitate the introduction of the spools therein. Such an arrangement also enables removal of the spools and the cables from the container simply by opening the cover 32 and unfastening the guard 56. This is particularly useful when cables have to be buried in a junction between two aerial installations. It prevents the cables from having to be cut and spliced as it exists in the now generally used lashers.

Snap locks 60 are used to close the cover 32 on the casing.

The spools 34 of lashing wire will generally collapse if they are not appropriately supported. It is obvious that the unwinding of the wire 22 will be hindered and the spool may have to be scrapped. Instead of providing a complicated housing which would provide an adequate and continuous support for the spools, the applicant has conceived a means which renders the wire of the spool self-supporting as well as self-lubricating. The spools of wire are immersed in a hot bath of paraffin, wax or similar waxy materials. Air bubbles coming from the spool emerge from the bath as the wax penetrates in the free space between the wires. After the spool has been substantially impregnated, it is removed from the bath, to let it solidify in a rigid form. This stable shape prevents collapsing and permits an easy, progressive unwinding during the lashing operation.

The wire which unwinds is coated with wax and lubricates the passage between the straps 46 and 48. These straps being made of nylon textile retain a certain amount of wax between the threads which enables the passage of miles of cables without replacement of the straps.

The spool container 26 is lined with a layer of foam rubber 31 and a superposed layer 33 of nylon fabric. A slight pressure on the spool is obtained due to the foam rubber and an easy sliding of the spools from right to left (FIG. 3) is facilitated by the nylon fabric which is in contact with waxy spool.

The loading of the container is preferably made by adding new spools behind the rearmost spools already inside the container. This arrangement will enable the remaining parts of the spools to be save. This is important because the wire which is usually made of stainless steel is expensive and should not be wasted.

The cable lashing is obtained without creating any tension on the unlashed part of the cables as shown in FIG. 1. This lack of tension of the cables and the reduced tangential pull of the wire 22 enables the two cables 16 and 18 to twist only slightly over each other. The twisting maybe completely prevented by a cable leader. As it is shown in the drawings, the support cable 16 must preferably appear on the top of the transmission cable 18. This is especially true when an additional cable must be added to the one already installed.

The present cable lasher may also be operated by attaching the cables 16 and 18 to a post 24 the device 10 riding this lack the combined cables. A man may carry the device from one post to another barely noticing that the two cables are being lashed automatically. When he has reaches the next post, he then may take the combined cables 16 and 18 lashed with the lashing wire 22 and fixed then to the second post.

The latter operational procedure may be made only because the lasher is light. Such an operation by only one man could not be done with the device to Eitel disclosed in U.S. Pat. No. 3,185,444 mentioned above because such a lasher weighs about 70 pounds. The Eithel's device is compared because it is the device which is generally used now.

The present cable lasher may be used for the installation of telephone, television, telegraphic cables or electrical wires.

The present device may also be fixed to a post or a tree while the cables are pulled therethrough by an appropriate nylon rope. Joined with an appropriate leader cable to prevent cables from spiralling, it may also be mounted to a vehicle having a personnel basket or held by a tractor which can unwind the lashing wire over the cables.

The present device is very efficient and very cheap to operate because only one man can do the work for short distances and no parts are movable. Only the nylon straps must be changed, but this is seldom and is done very easily.

Two sets of spools wound in opposite directions may be adjacently set in the container 26. Wires from each of these sets are spirally wound in opposite directions on the cables. This arrangement is preferred when additional support is needed to hold the cables together.

FIG. 4a illustrates two consecutive spools 34 and 34' wound in opposite directions. The wire 22 and 22' of each spool individually unwinds directly on the cables 16 and 18 when both spools are pulled in the direction indicated by the arrows A.

Cable dancing is noticed in heavy loading and windy areas. It may be prevented by the swiveling assembly of the cables which is obtained by omitting the leader cable and pulling the cable by an appropriate rope.

In the terms of the trade, the present lasher is often referred to as a prelasher because the lashing is made prior to the permanent installation.

Many obvious modifications may be made to this invention without departing from the spirit of the invention. The applicant wishes to restrict his invention only by the scope of the following claims.

I claim:

1. A cable lasher for lashing together parallel cables, the said lasher comprising:
   a cylindrical container having an aperture at both ends thereof;
   at least one ringlike spool of a lashing wire disposed in said container, the said cables adapted to extend through said spool and the apertures of the container with said wire spirally unwinding from the center of the spool and winding around said cables they extend through the container;
   a pair of a spaced plates rigidly secured to the cable outlet end of the container; and
   adjustable straps individual to each plate and having their ends secured to opposite ends of the respective plates, the middle portions of the straps overlap each other so as to constitute a passage to receive and hold the cables and the wire together.

2. A cable lasher as recited in claim 1 wherein the straps are made of fabric.

3. A cable lasher as recited in claim 2, wherein the fabric is nylon.

4. A cable lasher as recited in claim 1, wherein the lashing wire is at least partly covered with wax and the straps are made of a threaded material which retains some wax from the wire.

5. A cable lasher as recited in claim 1, wherein the container is lined with a layer of foam rubber as to apply a slight pressure on the spool to prevent the latter from rotating.

6. A cable lasher as recited in claim 1, wherein a freely rotatable roller is mounted at the free end of the plates for facilitating the exit movement of the lashed cables when the latter are at an angle with the lasher.

7. A cable lasher as recited in claim 1, wherein the straps are lengthwise adjustably secured to the plates according to the diameter of the cables.

8. A cable lasher as recited in claim 6, wherein a bridging guard is mounted near the free ends of the plates and across thereto for securing the lashed cables between said guard and the rotatable roller.

9. A cable lasher as recited in claim 1, wherein the spools consist of two sets of oppositely wound wires for simultaneously spirally lashing the cables with two wires in two opposite winding directions.

10. A cable lasher as recited in claim 1, wherein the container is provided with a cover consisting of approximately cylindrical portion of the container.